US005286106A

United States Patent [19]

Burgos

[11] Patent Number: 5,286,106

[45] Date of Patent: Feb. 15, 1994

[54] SOAP CREAMER AND DISPENSER

[76] Inventor: Donald R. Burgos, 507 Witney Chase, Stone Mt., Ga. 30088

[21] Appl. No.: 981,793

[22] Filed: Nov. 25, 1992

[51] Int. Cl.[5] ........................ B01F 15/02; B67D 5/40; G01F 11/00

[52] U.S. Cl. ........................ 366/190; 222/235; 222/385; 366/279

[58] Field of Search ................ 366/190, 191, 194, 295, 366/343, 279; 222/226, 233, 234, 235, 385, 189, 190

[56] References Cited

U.S. PATENT DOCUMENTS

| | | | |
|---|---|---|---|
| 1,718,567 | 6/1929 | Lange | 366/190 |
| 1,956,788 | 5/1934 | Blum | 366/190 X |
| 2,731,173 | 1/1956 | Harrigan | 222/235 X |
| 2,740,558 | 4/1956 | Steele | 222/385 X |
| 2,959,358 | 11/1960 | Vork | 222/235 X |
| 3,220,954 | 11/1965 | Malbe | 222/190 |
| 3,289,897 | 12/1966 | Ginsberg | 366/190 X |
| 3,342,459 | 9/1967 | Myers et al. | 366/299 X |
| 3,523,629 | 8/1970 | Chi | 222/385 X |
| 3,750,910 | 8/1973 | Se-kit | 222/385 X |
| 3,863,903 | 2/1975 | Brehmer et al. | 366/279 X |
| 4,422,770 | 12/1983 | Geible | 366/279 X |
| 4,487,509 | 12/1984 | Boyce | 366/279 X |
| 4,497,580 | 2/1985 | Doyel | 366/190 |

FOREIGN PATENT DOCUMENTS

| | | | |
|---|---|---|---|
| 407636 | 9/1966 | Switzerland | 366/190 |

*Primary Examiner*—Kevin P. Shaver

*Attorney, Agent, or Firm*—Michael A. Mann

[57] ABSTRACT

A DC-motor-driven whisk blends soap remnants with water until creamy. The blending is done in a translucent housing over the motor where the shaft of the motor rotates the whisk. The soap cream is dispensed through a pump dispenser that extends into the housing. The whisk has two differently-shaped arms for more efficient blending and to avoid interfering with the pump dispenser. Water and soap are added through holes in the top of the housing that also enable soap fragrances to vent into the vicinity of the device.

9 Claims, 1 Drawing Sheet

SOAP CREAMER AND DISPENSER

BACKGROUND OF THE INVENTION

1. Field of the Invention

The present invention relates to devices for creaming and dispensing soap. More particularly, the present invention is a device that whisks water and small pieces of soap into a cream for dispensing.

2. Discussion of Background

Typically, hand soap is found in the form of bars or creams. Soap creams are typically placed in containers for dispensing by pump dispensers. Although soap cream dispensers have become increasingly popular, bars of soap are still found in most bathrooms and kitchens.

A bar of soap becomes somewhat difficult to handle when it is nearly used up because of its small size. Nonetheless, many people hesitate to throw away small bars and remnants of soap until they are completely used up.

There remains a need for an effective way to use remnants of soap and soap chips.

SUMMARY OF THE INVENTION

According to its major aspects and broadly stated, the present invention is a device for use with water and pieces of soap that comprises a translucent housing mounted over a small, battery-powered electric motor that rotates a shaft. One end of the shaft extends into the housing and a whisk is attached to that end so that it rotates with the shaft. A pump dispenser extends into the housing in such a way that it will not interfere with the rotating whisk. The pump dispenser dispenses the contents of the housing.

The whisk has two or more arms made of wires formed into closed shapes, such as a rectangle and a triangle, each shape defining an area and each arm sweeping a different area when rotated by the motor.

The housing has an axis that is an extension of the axis of the motor shaft. The dispenser pump extends into the housing toward this axis and preferably exits the housing away from the axis, near to the side of the housing but out of the way of the whisk.

When some water and pieces of soap are put into the housing through one or more holes formed in its top, and an on/off switch controlling the motor is turned to the "on" position, the whisk spins, whipping the soap and water into a cream that can be pumped via the dispenser. Moreover, the fragrance of the soap vents through the holes in the housing to circulate throughout the room.

The whisk is an important feature of the present invention. Because of its construction from wires, it is light-weight and easily turned by a small electric motor. The whisk also is designed with two arms that sweep out different areas through the soap and water mixture for more effective mixing. Preferably, one arm is roughly triangular and the other arm rectangular so that the wires of the arms pass through different portions of the mixture for better mixing.

The holes in the housing are another important feature of the present invention. The holes can serve two purposes: they permit access to the interior of the housing for water and pieces of soap, and they allow the escape of the fragrance of soap. Many hand soaps are pleasantly scented. Whisking soap pieces with a little water liberates this scent.

Another feature of the present invention is the cooperation of the whisk and the pump dispenser. Both extend into the housing interior but do not interfere because the dispenser tube extends toward the axis of the housing leaving the annular region available for the whisk.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
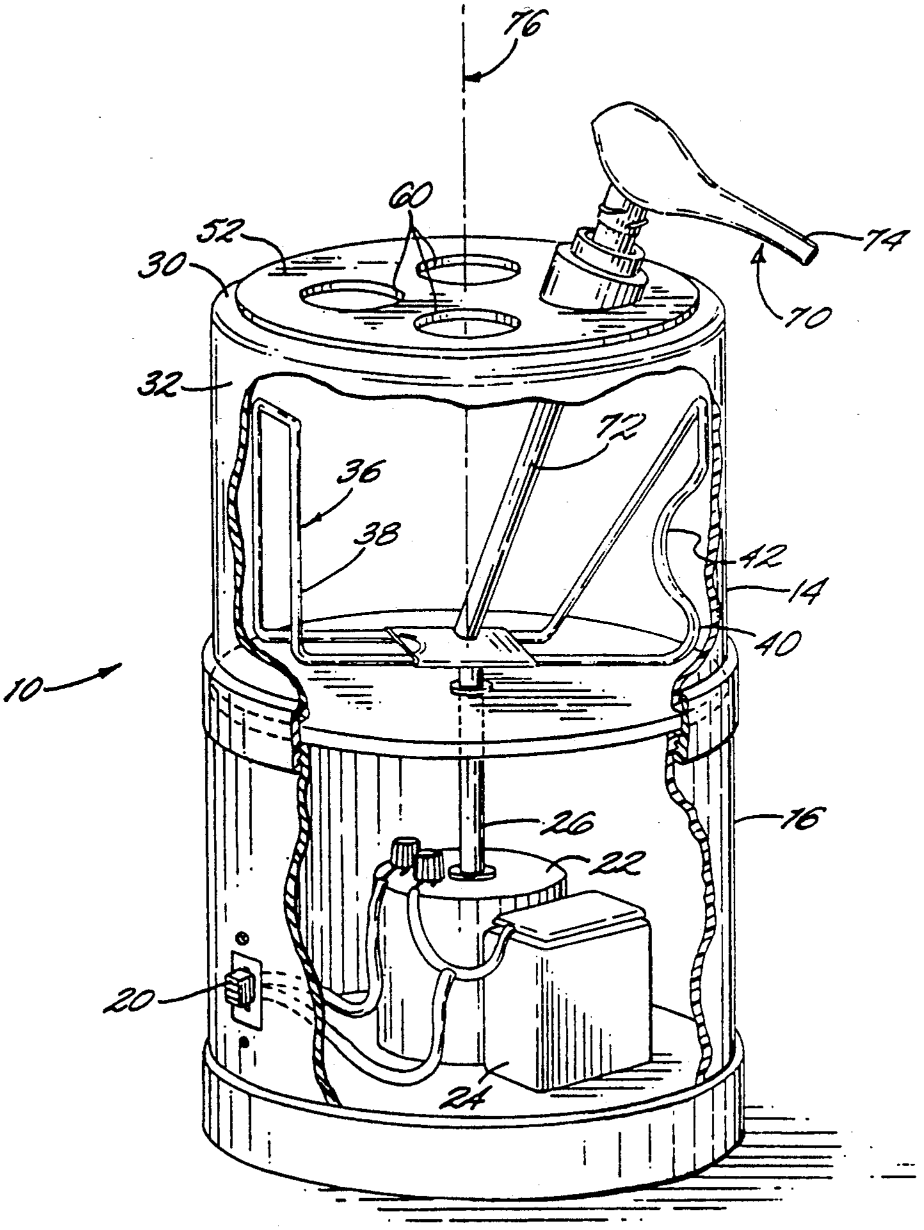
FIG. 1 is a perspective, partially cut away view of a device according to a preferred embodiment of the present invention.

Referring now to FIG. 1, there is shown a perspective view of a device 10 for whisking soap remnants and water to a cream for dispensing. Device 10 has a housing 14, and a lower container 16. Housing 14 has an on/off switch 20 and contains a small, DC motor 22, preferably powered by a battery 24. Switch 20 may be a slide switch with "on" and "off" position, as illustrated in FIG. 1, or another type of switch such as a push-button switch that activates motor 22 as long as it is depressed. Motor 22 rotates a shaft 26 that extends into the interior of housing 14.

Housing 14 has a top 30 and a side 32. Shaft 26 extends from the motor into housing 14, terminating in whisk 36. Whisk 36 has at least two opposing arms 38, 40. Arms 38, 40 are shaped and dimensioned to provide effective whisking of water and pieces of soap. For example, arm 38 comprises a wire formed in the shape of a rectangle and arm 40 is a wire shaped generally into a triangle but preferably with a small curved section 42 that serves to fill part of the open area of the triangle. The shape of the bent wire defines an area. As shaft 26 rotates whisk 36, arms 38, 40 sweep out different areas because of their different shapes, meaning that the wires pass through different portions of the interior of housing and any soap/water mixture therein. When the soap/water mixture is whisked sufficiently, it will be creamy, perhaps almost foamy. If arms 38, 40 had the same shape, they would simply be "carving" the same path through the foam and not mixing it efficiently.

Top 30 has a removable cover 52 with a plurality of holes 60. Holes 60 are of approximately equal size. While three holes 60 are shown, it will be understood that housing 14 and cover 52 may have any convenient number of holes.

A pump dispenser 70, preferably the well-known type of finger pump with a shaft 72 and a nozzle 74, is mounted to cover 52 with shaft 72 extending into the interior of shaft 72. Cover 52 is preferably screwed or press-fitted to housing 14 and can be removed for putting larger remnants of soap into housing 14 or cleaning housing.

Shaft 72 of dispenser 70 is preferably angled towards the axis 76 of housing 14, terminating just above shaft 26. This configuration prevents interference between mixing blades 38, 40 and shaft 26 when device 10 is operated. In addition, nozzle 74 is preferably located near the outer edge of cover 52, away from axis 76, so that the user can readily operate nozzle 74 with one hand to dispense the soap mixture into the other hand.

Device 10 is used as follows. Water and soap pieces are inserted through holes 60, or top 30 when cap 52 is removed, into the interior of housing 14. Alternatively, cover 52 is removed and soap pieces are placed in housing 14. Warm water is added in an amount sufficient to cover the soap. Then, the user turns switch 20 to the "on" position to rotate whisk 36. The motion of arms 38, 40 swirls and blends the water and soap fragments into a smooth, creamy mixture. When the soap is fully creamed, switch 20 is turned to the "off" position. The soap mixture is dispensed for use simply by pushing nozzle 74 downwards to draw the mixture up shaft 72 and through nozzle 74.

The blended mixture preferably has a viscosity approximating that of heavy cream or liquid soap, that is, liquid enough to flow freely through dispenser 70 yet viscous enough to remain contained in the user's hand when dispensed from container 12. Fragments of hard-milled soaps generally require more water than softer soaps. Warm water typically blends faster with soap than does cold water. Many soaps are pleasantly scented. Holes 60 in device allow the fragrance of such soaps to escape into the air in the vicinity of device 10.

Device 10 may be placed wherever convenient, such as in a kitchen, bathroom, or utility room where soap is used and soap fragments may be collected.

Housing may be made of translucent or transparent plastic for ease in determining the level of soap and water. In addition, a clear container 12 allows the user to observe the mixing process and determine when the soap and water have been properly blended for use.

Shaft 26 and whisk 36 are preferably fabricated of some durable, inexpensive alloy such as stainless steel. Dispenser 70 is a familiar type of plastic, finger-operated pump such as is commonly found on shampoo bottles, liquid detergent bottles, and the like.

As noted above, device 10 is preferably operated by a battery-powered DC motor contained within lower container 16. Batteries for the motor are located in lower container 16. The motor is selected to rotate agitator 36 at a speed sufficient to smoothly blend soap fragments and water into a creamy mixture, but not so fast as to generate lather or foam.

It will be apparent to those skilled in the art that many changes and substitutions can be made to the preferred embodiment herein described without departing from the spirit and scope of the present invention as defined by the appended claims.

What is claimed is:

1. A device for use with water and pieces of soap, comprising:

a housing having an axis;

a motor adjacent to said housing;

a shaft having a first end and a second end, said first end rotated by said motor, said second end of said shaft extending into said housing;

a whisk attached to said second end of said shaft and rotatable within said housing by said motor, said whisk having a first wire arm, and a second wire arm, said second wire arm having a different shape than said first wire arm so that said first wire arm sweeps out a different area than said second wire arm when rotated by said motor; and a pump dispenser carried by said housing and extending into said housing so that said pump dispenser can pump out the contents of said housing, said pump dispenser positioned so as not to interfere with said whisk, said pump dispenser extending toward said axis of said housing from a point on said housing away from said axis so as not to interfere with said whisk when said whisk rotates.

2. The device as recited in claim 1, wherein said housing has at least one open hole in said housing.

3. The device as recited in claim 1, wherein said housing is made of a translucent material.

4. A device for use with water and pieces of soap, comprising:

a housing;

a motor adjacent to said housing;

a shaft having a first end and a second end, said first end rotated by said motor, said second end of said shaft extending into said housing;

a whisk attached to said second end of said shaft and rotatable within said housing by said motor, said whisk having a first wire arm and a second wire arm, said first wire arm having a rectangular shape and said second wire arm having a triangular shape so that said first arm sweeps out a different area than said second arm when said arms are turned by said motor, said first arm sweeping out a rectangular area and said second arm sweeping out a triangular area when said first and second arms are turned by said motor; and means for dispensing the contents of said housing.

5. The devices as recited in claim 1, wherein said housing is made of a translucent material and has at least one hole formed therein for putting water and pieces of soap into said housing.

6. The device as recited in claim 1, wherein said housing has an axis and wherein said dispensing means is a pump dispenser extending toward said axis of said housing.

7. The device as recited in claim 1, wherein said housing has an axis and wherein said dispensing means is a pump dispenser extending toward said axis of said housing from a point on said housing away from said axis.

8. The device as recited in claim 1, further comprising means for activating said motor.

9. The device as recited in claim 1, wherein said housing is mounted above said motor.

* * * * *